United States Patent Office 3,427,272
Patented Feb. 11, 1969

3,427,272
WATER-SOLUBLE POLYURETHANE PRODUCED BY REACTING AN ALDEHYDE AND THE REACTION PRODUCT OF AN ORGANIC DIISOCYANATE AND AN ANHYDROUS POLYALKYLENE ETHER GLYCOL
Edgar Dare Bolinger and Emile E. Habib, Spartanburg, S.C., assignors to Deering Milliken Research Corporation, Spartanburg, S.C., a corporation of South Carolina
No Drawing. Continuation-in-part of application Ser. No. 597,221, Nov. 28, 1966. This application Mar. 22, 1968, Ser. No. 715,158
U.S. Cl. 260—29.4                   25 Claims
Int. Cl. C08g 22/04

ABSTRACT OF THE DISCLOSURE

A water-soluble aldehyde modified polyurethane produced by the reaction of an aldehyde and a water-soluble polyurethane in a dilute aqueous solution at a pH between about 3 and 10 and a temperature between about 0° and 100° C.; said polyurethane having polymeric constituents reactive toward carbonyl groups and being the reaction product of a substantially anhydrous polyalkylene ether glycol and at least 0.5 molar equivalent of an organic diisocyanate; said aldehyde modified polyurethane being characterized by higher film strength than the unmodified polyurethane at high relative humidities. Also, the process for producing the above product.

---

This application is a continuation-in-part of our copending application Ser. No. 597,221 filed Nov. 28, 1966, which is a continuation-in-part of our application Ser. No. 43,297 filed July 18, 1960, now abandoned.

The present invention relates to a process for improving the properties of certain water-soluble polyurethane polymers of alkylene ether glycols and diisocyanates, to polymers thus produced and to uses therefor.

The water-soluble polymers of the invention are useful as textile sizes and as water-soluble coatings and packaging films, e.g., for articles of manufacture, fruits and vegetables. The polymers of this invention are useful as adhesives and binders in the textile, leather and paper industries and as intermediates in the production of synthetic resins for casting, coating and molding with and without fillers, dyes and pigments.

Heretofore, starch and carboxymethylcellulose have been used as the basic ingredients of most textile sizing formulas. Some advantages have been obtained in the use of synthetic size materials other than modified starch, especially in connection with synthetic yarns. However, earlier synthetic sizing materials have met with limited success because of their high cost and because they are useful only with a limited number of fibers. Polyethylene glycol terephthalic acid ester yarns, e.g., Dacron, have been particularly difficult to size with known sizing materials and sizing spun Dacron yarn has remained a major textile problem prior to this invention.

It is an object of this invention to provide high molecular weight, water-soluble, tough, flexible, aldehyde-modified polymers of polyalkylene ether glycols and diisocyanates and a process for their production.

Another object of this invention is to provide compositions and a process for their production which can be used as sizes for textile yarns in general and spun and filament polyethylene glycol terephthalic acid ester yarns in particular.

Another object of the invention is the provision of a synthetic size which can be desized with plain water.

A further object is the provision of a size which creates a lesser stream pollution problem than starch.

Still another object is to provide sizes having improved strength and reduced moisture sensitivity.

Other objects will be apparent to those skilled in the art to which this invention pertains.

The water-soluble polymers of this invention are characterized by their excellent film-forming properties. They are readily water-soluble, making them easy to apply to textile yarns as a size, and they retain their solubility so that desizing may be accomplished by a simple water wash. The films formed from water solutions of these new polymers, although water-soluble, are very flexible and stronger at high relative humidities than the starting water-soluble polyurethanes. These aldehyde modified polymers are particularly valuable as textile sizes because of their reduced sensitivity to atmospheric humidity, thus making yarns sized with these polymers much less tacky under practically all weave room conditions.

The water-soluble aldehyde modified reaction products of polyalkylene ether glycols and diisocyanates of this invention have many advantages over prior art sizing materials, e.g., their use results in improved weaving efficiency. Good yarn penetration is obtained at any normal operating temperature. Hard size at the squeeze rolls is substantially eliminated. There is no objectionable sticking on conventional drying cans. Separation of the yarns at the split rods is smooth and even, and broken ends seldom are produced. At the same time, the size holds the fibers of individual yarns in a very close, tight, unitary relationship for efficient weaving.

The water-soluble polymers of this invention are highly versatile as textile sizes. They perform on spun and filament polyethylene glycol terephthalic acid ester yarns, e.g., Dacron yarns, in a manner superior to any size heretofore available. They can be used on wool, cotton, acetate, nylon, viscose, and glass yarns and mixtures thereof with outstanding results. Their use results in a lower incident of "seconds" in the finished fabrics. Yarns sized by the polymers of this invention are stronger and have such superior weaving properties and strength that lower twist yarn can be employed, thus providing greater savings and producing a softer fabric. The clarity of the size permits examination of the fabric on the loom and the size need not be removed to produce an acceptable looking finished fabric.

The starting polyalkylene ether glycol diisocyanate polymers employed to produce the polymers of this invention are also acceptable sizes, and, in many ways, are superior to other sizes available. However, they are more moisture sensitive than, and thus are not so versatile as, the polymers of this invention when used as sizes. For example, the polymer produced by the reaction of polyalkylene ether glycol having an average molecular weight of about 6,000 with about 1.1 molar equivalent of toluene 2,4-diisocyanate in tolunee until a highly viscous reaction product is produced and the reaction then chain terminated with a lower-alkanol, is too tacky for efficient use when the humidity of the weave room exceeds about 55% relative humidity. This effect is partially remedied by reacting the polymer, before it is chain terminated, with about two molar equivalents of an epoxide, e.g., propylene oxide. The resulting polymer is considerably less moisture sensitive but does not have optimum properties insofar as tackiness in moist, e.g., 65% relative humidity, atmospheres is concerned.

Each of the above-described types of starting polymers, i.e., water-soluble polyalkylene ether glycol diisocyanate polymers and water-soluble epoxide modified polyakylene ether glycol diisocyanate polymers, can be rendered more useful as textile sizes by reaction of these water-soluble polyurethanes with an aldehyde. In fact, starting polymers which ordinarily are unsuitable as a size because of high moisture sensitivity and/or low adhesive or cohesive strength, e.g., those having a viscosity below 6,000 cps. at 25° C. as a 25% aqueous solution, can be substantially improved to produce useful sizes according to the process of this invention.

I. THE STARTING POLYMERS

The starting polymers of this invention are the water-soluble polyalkylene ether glycol polyurethanes having polymeric substituents reactive toward carbonyl groups. These are ordinarily secondary nitrogens of the urethane groups or hydroxy alkyl groups attached thereto.

The preferred starting water-soluble polyurethanes for the process of this invention are those having polymeric units of the formula:

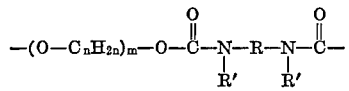

wherein R is a divalent nonreactive aliphatic or aromatic, preferably carbocyclic radical, e.g., lower-alkylene, containing from 2–8 carbon atoms, pyridylene, thiophenylene, phenylene and substituted phenylene, e.g., tolylene, nitrophenylene, para-diphenylene, naphthylene, etc., R' is hydrogen or —CH(R'')—CH(R'')—OH, R'' being hydrogen or a nonreactive aliphatic or aromatic radical, e.g., lower-alkyl containing from one to eight carbon atoms, inclusive, phenyl, substituted phenyl, $n$ is an integer from 2 to 8 inclusive, preferably 2, and $m$ is an integer from about 15 to about 450, preferably about 45 to 225 and more preferably about 100 to 160. $n$ can also be the average value resulting from the alkylene groups alternating between ethylene and e.g., propylene or a higher alkylene.

The numerical values of $n$ and $m$ are determined by the starting polyalkylene ether glycol, e.g., $n$ is 2 when the polymer is a polyethylene ether glycol and $m$ is about 133 when the molecular weight of the starting glycol is about 6,000. R is a connecting radical between the isocyanate groups of the diisocyanate employed to produce these polymeric units, e.g., R is phenylene when m-phenylene diisocyanate is employed. R'' is $$CH(R''')—CH(R''')—OH$$

when the resulting polyurethane (R=H) is further reacted with an epoxide, e.g., —CH(CH$_3$)—CH$_2$OH in the case of propylene oxide.

These polymeric units are present in polyurethanes of the formula:

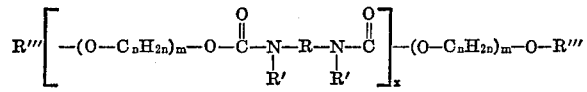

wherein R, R', $n$ and $m$ have the values given above and R''' is hydrogen or

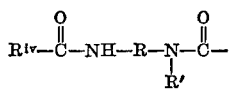

wherein R' has the value given above and R$^{iv}$ is the radical of the compound used to chain terminate the polymerization reaction, e.g., lower-alkoxy, aryloxy, alkanoyloxy, and $x$ is an integer greater than one, usually a value sufficient to provide a molecular weight of a hundred thousand or more for the resulting polymer. It will be apparent that $x$ increases in value as the polymerization reaction proceeds. No exact value can be ascribed to $x$ as the number varies considerably, depending upon the polymerization reaction conditions and is, at best, an average number. The desired degree of polymerization is best determined by the physical characteristics, e.g., viscosity film properties, of the resulting product.

The frequency at which R''' is H depends in part upon the molar ratio of diisocyanate to polyethylene ether glycol employed to produce this starting polyurethane. If the lowest possible ratio of 0.5 to 1 were employed, theoretically R''' should always be H and $x$ should be 1. However, to produce a starting polymer having the optimum properties, the molar ratio is preferably from about 1.0:1 to 1.5:1. Under these conditions, R''' should always be the alternate structure given above. However, because of the viscosity of the reaction mixture, neither of these theoretical conditions are probably reached and R''' is probably a mixture of the two alternative possibilities in the resulting polymer molecules.

a. Polyalkylene Ether Glycol Diisocyanate Starting Polymers

The starting water-soluble polyalkylene ether glycol diisocyanate polymers of this invention are prepared by reacting a substantially anhydrous polymer of polyalkylene ether glycol, e.g., having a molecular weight of from about 750 to 20,000 with at least 0.5, e.g., 0.6, 0.7, 0.8 and preferably at least about 1, e.g., 0.9 to 1.2 molar equivalent of diisocyanate, preferably an aryl diisocyanate. In practice, slightly more than 1 molar equivalent of diisocyanate is ordinarily preferred. Less than 2.0 and ordinarily less than 1.5 molar equivalents is used. The preferred molar ratio of diisocyanate to glycol is from about 1.0:1 to 1.2:1. If other isocyanate reactive groups are present in the reaction mixture, e.g., hydroxy groups, additional diisocyanate must be added if the above molar proportions are to be maintained. A 1:1 molar ratio of isocyanate groups to groups reactive to isocyanate groups is the preferred minimum ratio.

The term "polyalkylene ether glycol" as used throughout the specification and claims refers to water-soluble polyether glycols which are derived from alkylene oxides or glycols and preferably may be represented by the formula HO(C$_n$H$_{2n}$O)$_m$H, in which $n$ is an integer from 2 to 8 and $m$ is an integer from about 15 to about 450. Not all the alkylene radicals present need be the same, and polyether glycols containing a mixture of alkylene radicals can be used. These polyalkylene ether glycols are either viscous liquids or waxy solids. The molecular weights of the polyalkylene ether glycols which are most useful in the process of this invention are from about 2,000 to 10,000 and most desirably from about 4,000 to 8,000, e.g., 5,500 to 7,000. The term includes the polyethylene, polypropylene, polytrimethylene, polytetramethylene, and polybutylene ether glycols. The preferred glycols are polyethylene ether glycols. It will be obvious to one skilled in the art that to produce a water-soluble reaction product, the starting polyalkylene ether glycol must be water-soluble and the polymerization step is therefore limited to these starting polyalkylene ether glycols.

The term "substantially anhydrous polymer" is used to define a polymer containing less than about 0.5%, preferably less than 1.0%, moisture, i.e., containing only a trace of moisture. It has been found that some commercial polyalkylene ether glycols containing more than 0.5% moisture sometimes react to produce polymers of lower strength, making them less suitable for textile sizes. This can be avoided by increasing the molar ratio of diisocyanate to compensate for the water present. However, it is preferred to employ substantially anhydrous glycols as defined above.

Although the starting polyalkylene ether glycol polymer and reaction mixture should be substantially anhydrous, the latter preferably is not completely anhydrous as the reaction, to proceed in a desirable fashion, sometimes requires the presence of a trace of moisture, e.g., 10–500 parts per million on the polyalkylene ether glycol, to initiate the reaction. Thus, "substantially anhydrous" when used herein means containing less than 0.1% water. If the polymer solution is rendered anhydrous by distilling the aromatic solvent, water preferably is thereafter added in the range of about 100 to 200 parts per million.

A wide variety of diisocyanates can be used to prepare the starting polymers of this invention, but aryl, especially monophenyl diisocyanates are preferred. Suitable compounds include 2,4-tolylene diisocyanate, 2,6-tolylene diisocyanate, m-phenylene diisocyanate, 2,2'-dinitrodiphenylene - 4,4' - diisocyanate, cyclohexylphenyl-4,4'-diisocyanate, hexamethylene diisocyanate, diphenylene-4,4'-diisocyanate, diphenylmethane-4,4'-diisocyanate, di-para-xylylmethane - 4,4'-diisocyanate, naphthylene-1,4-diisocyanate and the corresponding 1,5 and 2,7-isomers thereof, fluorene - 2,7 - diisocyanate, chlorophenylene-2,4-diisocyanate and dicyclohexylmethane-4,4'-diisocyanate.

Any catalyst known to be useful in the reaction of polyalkylene ether glycols with diisocyanate may be used in the present invention including the tertiary organic bases of U.S. Patent 2,692,874, e.g., triethylamine, pyridine, their acid salts, tri-n-butylphosphine and the like. However, it has been found that particularly good results are obtained by using organo-metallic salts, e.g., cobalt naphthenate and similar salts of lead, zinc, tin, copper and manganese. The organic radicals may be either aliphatic or aromatic residues. Ordinarily, only a very small amount of the organo-metallic catalyst is required, e.g., from about 0.1 to 0.001% of the reactants.

Although the reaction can be conducted in the absence of a solvent, i.e., as a melt, it is ordinarily preferred to conduct the reaction in an inert solvent to avoid working with too viscous mixtures. Generally speaking, it is preferred to operate with reaction mixtures having a viscosity of less than 1,000,000 cps. It is possible to reach this viscosity, when operating without a solvent, before a reaction product is obtained which has optimum sizing properties. Thus, it is ordinarily desirable to employ a reaction solvent. Toluene is preferred. From a mechanical point, it is advantageous to keep the reaction mass at a viscosity below about 800,000 cps. However, if too much of an inert solvent is employed, it tends to interfere with the reaction and slow it down. This effect can, to a certain extent, be overcome by the use of larger amounts of catalyst. It is ordinarily desirable to employ only that amount of solvent which will impart a viscosity to the reaction mixture in the range of about 100,000 to 1,000,000 cps., preferably around 300,000 to 800,000 cps. With toluene at 75 to 85° C., employing polyethylene ether glycol of a molecular weight in the range of 5,500 to 7,000, this can be accomplished at an initial concentration of about 80% solids. As the reaction proceeds, the increasing molecular weight of the reaction product increases the viscosity of the reaction mixture, thus necessitating the gradual addition of more solvent throughout the reaction if about the same viscosity is to be maintained, e.g., until a final concentration of as low as 50% solids is reached. This serves two purposes, i.e., maintaining the desired viscosity and also slowing down the reaction. Thus, as the reaction product approaches water insolubility or gelation because of its increasing molecular weight, the reaction rate tends to slow down due to the presence of the increasing amounts of solvent, thereby providing more leeway in the time at which the chain terminating agent should be added to prevent the production of a water-insoluble reaction product. The amount of solvent employed can be varied considerably, e.g., from about 10% to 60% of the total reaction mixture.

The temperature of the polymerization reaction can be varied over a considerable range so long as the reaction is stopped at the desired point. The reaction proceeds slowly unless the temperature is above about 65° C. However, the temperature should not exceed 150° C., and preferably should not exceed 110° C. The preferred range is from about 70° C. to 90° C. The reaction time is a function of such factors as temperature, mixing speed, ratio of the reactants, water concentration and amount of catalyst and solvent employed.

Oxidation and discoloration of the reaction product can be avoided by conducting the polymerization reaction in an inert atmosphere, e.g., nitrogen, which also aids in the production of a more uniform reaction product.

When the desired viscosity is reached, the resulting polymer can be chain terminated in the manner described hereinafter, or epoxide modified as described below and then chain terminated.

b. Epoxide Modified Polyalkylene Ether Glycol Diisocyanate Starting Polymer

The epoxide modified polyalkylene ether diisocyanate starting polymers are prepared by the reaction of a polyalkylene ether glycol diisocyanate polyurethane described above with an epoxide. This reaction can proceed concomitantly with the primary polymer production, i.e., as soon as some of the above-described polymer has been produced, it can be reacted with the epoxide. Thus, although the epoxide can be added at almost any point during the primary polymer reaction, the only requirement is that at least the terminal portion of the polymer production is conducted in the presence of the epoxide. The preferred procedure involves adding the epoxide to the reaction mixture for a few minutes, e.g., 1 to 15 minutes, before the polymer is chain terminated.

Examples of epoxides, preferably the compounds which can be prepared from $\alpha$-glycols, are the lower hydrocarbon, i.e., containing from 2 to 12 carbon atoms, epoxides including styrene oxide, $\alpha$-phenyl propylene oxide, trimethylene oxide and the other lower alkylene oxides, i.e., epoxides containing from 2 to 8, preferably 2 to 4, carbon atoms, inclusive, e.g., ethylene oxide, propylene oxide, butylene oxide, isobutylene oxide. The epoxides preferably are monofunctional, i.e., contain no other groups reactive to the polymer.

The amount of epoxide which can be added to the polyethylene ether glycol diisocyanate polymer can be varied over a wide range, i.e., from about 0.1 mole per mole of diisocyanate to the theoretical 2 moles per mole of diisocyanate or more. Conveniently, and preferably if the epoxide is volatile, an excess of the epoxide can be added and the excess removed by distillation or evaporation after the reaction has proceeded to the desired extent.

The epoxide modified portion of the polymerization reaction is ordinarily conducted in substantially the same manner as the preceding portion of the polymerization reaction. However, when a particularly volatile epoxide is employed, e.g., ethylene oxide, it may sometimes be necessary to lower the reaction temperature or employ pressure equipment to prevent excessive loss of the epoxide.

As stated above, the point at which the reaction should be modified by the addition of an epoxide so as to produce a polymer which is still water-soluble is not particularly critical, so long as the epoxide is added before the polymer reaches maximum permissible viscosity. Visual inspection of the reaction mass, i.e., its viscosity, reaction to stirring, stringiness, etc., provides a good guide, and with any given reactants empirical viscosity determinations may be used. The optimum total polymerization reaction time, including the epoxide modified portion, can be determined by the procedures described hereinafter.

These epoxide modified starting polymers are then chain terminated in the manner described below.

c. Chain Termination of the Starting Polyalkylene Ether Glycol Diisocyanate Polymers The chain termination of a polymer is a well known reaction in polymer chemistry. In this step, the terminal, reactive groups of the polymer are reacted with a non-chain extending compound which inactivates these groups. In the instant polymer, the reactive terminal groups are isocyanate groups. These groups merely require a non-chain extending compound having an active hydrogen, i.e., those hydrogen atoms which display activity according to the well known Zerewitinoff test. See J. Am. Chem. Soc., 49, 3181 (1927). For a discussion of diisocyanate chemistry, see National Aniline Division of Allied Chemical and Dye Corporation Technical Bulletin I-17 and the references cited therein. For the purposes of this invention, such compounds are limited to those which do not form unstable intermediate groups or produce further polymerization, as would be apparent to those skilled in the art. Some polyfunctional compounds, i.e., those having a plurality of active hydrogens, are not preferred because of the tendency of some of these compounds to produce excessive cross linking. The preferred chain terminating agents are thus those having only one active hydrogen. Suitable chain terminating agents are alcohols, water, ammonia, primary amines, cyclic secondary amines, acids, inorganic salts having an active hydrogen, mercaptans, amides, alkanol amines, oximes, etc. The preferred class of compounds are the organic monohydroxy compounds, preferably monohydroxy alcohols and especially the saturated aliphatic monoalcohols, aryl monohydroxy compounds and the like, which can be employed irrespective of the incidence of terminal isocyanate groups. Lower alkanols, i.e., containing from one to eight carbon atoms, inclusive, are preferred, especially those containing less than four carbon atoms. Methanol, ethanol, and isopropanol, being both efficient and inexpensive, are excellent chain terminating agents for terminating the polymerization reaction at the desired point. However, because the aldehyde modification step of this invention is most conveniently conducted as an aqueous solution, the polymer can conveniently be chain terminated by adding enough water to produce the desired solids concentration and then distilling any organic solvent present in the mixture.

The minimum amount of chain terminating agent which should be employed will vary according to the ratio of diisocyanate to hydroxy groups present in the reaction mixture and the extent to which the polymerization reaction has proceeded. While a theoretical minimum may be readily calculated, e.g., 0.01–1 molar equivalents, it is preferred to add at least several molar equivalents, calculated on the diisocyanate used, as a safe excess.

The total polymerization time, including the epoxide modified portion if this starting polymer is employed, can vary considerably depending, in part, on the molecular weight of the starting polyalkylene ether glycol, the reaction temperature, the catalyst and amount of solvent employed. If the reaction time is too short, under the selected conditions, the resulting polymer will produce a relatively weak, brittle size. Conversely, if the reaction time is too long, the reaction product may not be water-soluble.

The exact limits of reaction time, under a particular set of reaction conditions, can be determined by removing samples from the reaction mixture from time to time, chain terminating the sample with a lower alkanol, e.g., ethanol, and then making a 25% aqueous solution thereof, while removing whatever reaction solvent may be present. If the 25% aqueous solution has a viscosity at 25° C. of at least 2,000 cps., and preferably at least 8,000 cps or more, the desired reaction product can be obtained from the reaction mixture upon chain termination thereof. Obviously, if the alcohol stopped sample is water-insoluble, the reaction has proceeded too far and the reaction time was too long.

Another convenient index for determining the course of reaction is the viscosity of the reaction mixture. If the reaction is conducted at 75 to 85° C. with toluene as a reaction solvent, a 65% solution of the reaction mixture should have a viscosity in the range of 50,000 to 1,000,000 cps. As stated before, such a reaction mixture produces a highly satisfactory size if chain terminated at a viscosity of around 200,000–800,000 cps.

In carrying out a preferred method of the above-described process, a polyethylene ether glycol having an average molecular weight of about 6,000 is melted under nitrogen. Toluene is then added and any water present in the glycol is removed by azeotropic distillation at reduced pressure until the mixture is substantially anhydrous. The cobalt naphthenate is then added followed by the tolylene diisocyanate. Water in an amount of about 150 parts per million is then slowly added. As the reaction proceeds and the viscosity increases, more solvent is slowly added to keep the viscosity within the range of about 200,000 to 300,000 cps. When a 65% solution of the reaction mixture reaches at least 200,000 cps., about 2 molar equivalents of propylene oxide, calculated on the tolylene diisocyanate, is added. When the desired ultimate viscosity of about 500,000 cps. is reached, any excess propylene oxide is removed at reduced pressure and a molar excess, calculated on the tolylene diisocyanate, of ethanol is added as a chain terminating agent. Water is then added and the toluene is stripped from the mixture at reduced pressure. The aqueous residue can then be diluted to a standard concentration.

Alternatively, the starting polymer for the aldehyde modification step can be employed as a solution in an organic rather than aqueous solvent, for example, the solvent employed in the polymerization reaction, as the aldehyde reaction of the process of this invention proceeds in organic solution as well as aqueous solutions.

II. ALDEHYDE MODIFICATION OF THE STARTING POLYMER

In the process of this invention, a starting water-soluble, preferably chain terminated, polyurethane described above, usually as an aqueous solution, is reacted with an aldehyde, thereby producing a polymer having improved properties, including increased film strength and resistance to atmospheric moisture.

A wide variety of aldehydes can be employed, both aromatic and aliphatic. The aldehyde can be monoaldehydic or polyaldehydic. It is preferred if the aldehyde has no groups other than aldehydic which can be reacted with the starting polymer. Examples of aldehydes, e.g., aliphatic preferably containing one to twelve carbon atoms, include formaldehyde, acetaldehyde, propionaldehyde, butyraldehyde, nonaldehyde, formylcyclohexane, and other lower aliphatic and alicyclic monofunctional aldehydes, glyoxal, pyruvaldehyde, ethylglyoxal, amylglyoxal, and other $\alpha$-carbonyl lower aliphatic aldehydes, benzaldehyde, cinnamaldehyde, phenylacetaldehyde, $\alpha$-naphthaldehyde, pyrocatechualdehyde, veratraldehyde, $\alpha$-formylthiophene, $\alpha$-formylfuran, and other substituted and unsubstituted aromatic aldehydes, dialdehyde starch, and other aldehyde carbohydrates and aldehydic cellulosic materials. The preferred aldehydes are the lower, i.e., containing from one to twelve carbon atoms, inclusive, aliphatic and carbocyclic aromatic monoaldehydes. Formaldehyde is the aldehyde of choice.

The reaction of the starting polymer with the selected aldehyde can be conducted at any convenient temperature, e.g., 0° to 100° C., although a temperature between about 20° C. and 85° C. is more desirable and between about room temperature and about 70° C. preferred. If it is desired to have the reaction reach completion very rapidly, a temperature of about 70° C. should be employed. Conversely, if it is feared that the reaction may proceed too rapidly toward an insoluble product, e.g., when operating at a pH from about 3 to 5 with relatively large amounts of aldehyde, then room temperature or lower should ordinarily be employed.

The reaction can be conducted at any pH between about 3 and about 10. Outside this range, the starting and resulting polymer tend to be unstable. Ordinarily, it is preferred to stay within the range of about 3.5 to about 9. If it is intended to produce an acid size, e.g., one particularly useful on wool or nylon, the reaction can be conveniently conducted at a pH of between about 3 and 7, preferably between about 3.5 and 6. For Dacron, Orlon, viscose, acetate, triacetate, cotton and other yarns, the reaction can be conducted at a pH of between about 7 and 10, preferably between about 7.5 and 9.

The amount of aldehyde which can be added to the starting polymer without producing or proceeding too rapidly toward a water-insoluble reaction product is closely related to the pH of the reaction mixture. On the alkaline side, much more of the aldehyde can be added with safety than on the acid side. In fact, at an alkaline pH it is sometimes preferred to have excess unreacted aldehyde in the size mixture as the resulting size appears to be more stable to heat. For example, the propylene oxide modified polymer produced from polyethylene ether glycol and tolylene 2,4-diisocyanate, as a 25% aqueous solution with a viscosity of about 15,000 cps., can react, at room temperature, with 0.03% calculated on polymer solids, of formaldehyde at a pH of 4 and 0.1% formaldehyde at a pH of 5 without producing a water-insoluble gel in a reasonable time, e.g., several days, whereas at a pH of 8, the same polymer can react with 1-3% or more formaldehyde and still produce water-soluble reaction products. It will be apparent from the above that, when operating at an alkaline pH, care should be taken that the pH does not drift during the reaction to the acid side. This can be avoided by conducting the reaction in the absence of oxygen to prevent the air oxidation of the aldehyde or buffering the solution, e.g., with $Na_2HPO_4$. Also, when operating on the acid side, if the reaction product is approaching water insolubility, the pH of the reaction mixture can be adjusted upward, e.g., with an organic or inorganic base, e.g., ethyl amine, sodium hydroxide or ammonia, to render the reaction product less reactive toward the residual aldehyde.

Generally, it is preferred to employ less than 0.1% and more preferably less than 0.05%, of formaldehyde, calculated on the polymer solids, when the reaction is conducted at a pH of less than 7, whereas less than 10% and preferably less than 5% is employed at a pH of greater than 7. The large difference between these amounts of aldehyde apparently is due to the type of reaction which occurs. On the acid side, the reaction appears to be predominately one of crosslinking, which increases the molecular weight of the polymer rapidly with a small amount of aldehyde whereas on the alkaline side, the addition is probably linear, e.g., as $-CH_2-O-$ groups in the case of formaldehyde.

In any case, the reaction is conducted for a time less than that required to produce a water-insoluble reaction product. The preferred starting reaction mixture is preferably aqueous, e.g., with 20-30% polymer solids. These mixtures can have a viscosity from about 2,000 to as high as 50,000 c.p.s. or higher at 25% solids at 25° C. With a highly reactive aldehyde, e.g., formaldehyde, on the acid side at, e.g., 90° C., the desired viscosity can be reached in a matter of minutes. At room temperature, the viscosity can slowly rise for several weeks or more on the acid side employing less than 0.1% of the aldehyde or when employing a slowly reacting aldehyde such as dialdehyde starch. On the alkaline side, any viscosity change usually is less rapid.

Generally, when the viscosity of a 25% aqueous solution of the reaction mixture reaches 100,000 cps. or more on the acid side, optimum properties of the reaction product have been reached. On the alkaline side, the reaction mixture need merely be maintained for a sufficient length of time to insure reaction, e.g., a few hours at 70° C. or a few days at room temperature. When used as a size, the resulting product will have enhanced resistance to tackiness at high relative humidities while retaining water solubility and, at the same time, greater cohesive properties. The starting polymers cannot readily be carried to their optimum properties as a size as these properties are realized close to the point at which the reaction mixture turns to a water-insoluble gel, thus rendering the process difficult in production. By reacting these starting polymers, chain terminated at a reaction time at a safe point away from gelation, with an aldehyde according to the process of this invention, a reaction product can be obtained with enhanced properties as a size without substantial risk of insolubilization, i.e., over reaction, particularly on the alkaline side. Of course, insoluble gels can be obtained even with the aldehydes employed in the process of this invention, by deliberately adding an excess amount of aldehyde at a low pH and at an elevated temperature. However, this result can readily be avoided by employing the proper amount of aldehyde at about room temperature. Even an excess of the aldehyde will not prevent use of the resulting polymer as a size if it is applied to the yarn at room temperature or lower, as the reaction toward insolubilization is a slow and predeterminable one, especially at lower temperatures. Also, as stated above, when the viscosity of the reaction mixture approaches the point where insolubilization appears probable, the pH can be adjusted upward or the excess aldehyde removed by volatilization or reaction with ammonia or an amine to reduce the likelihood of further reaction. The use of polyurethanes of this invention in which the starting polymers are end-blocked with alkoxy groups, i.e., alcohol chain terminated polymers have been found to be particularly valuable as sizes.

The stability of the polymers of this invention as aqueous solutions is excellent so that they may be stored in any of their liquid or solids forms and their good water solubility permits mixing at any point in the mill thereby eliminating a separate cooking operation, e.g., as required for starch and other conventional sizes.

Yarns which can be sized with the polymers of this invention include both spun fiber yarns and filament yarns. The invention is particularly applicable to spun and filament Dacron, cotton, nylon, Orlon, wool, viscose, acetate and blends of any two or more of the above.

Sizing yarns with a size of this invention can be performed according to usual procedures. The novel polymers can be dissolved in water and used at any temperature between room temperature and the boil. However, excellent yarn penetration is obtained at temperatures between 50° C. and 80° C. and higher temperatures are entirely unnecessary when employing a 3-12% solids aqueous solution of the size.

The amount of size to be applied will vary somewhat according to the nature of the fibrous materials, the type of yarn, the denier or count and the like, but generally an amount is employed in the range of 0.5-15%, calculated on the solids and dry fabric. In general, 0.5 to 3% polymer solids for a filament yarn and 3% to 10% for a spun yarn, based on the weight of the yarn, provides suitably sized yarn. Similarly, the solids concentration of the sizing solution can vary over a fairly wide range, e.g., from about 2% to 15%.

The following preparations and examples are illustrative of the process and products of this invention, but are not to be construed as limiting.

PREPARATION I

Heat under nitrogen with rapid stirring 3,750 grams of polyethylene ether glycol having an average molecular weight of about 6,000 in a 12 liter 3 neck round bottom flask at 70 to 80° C. Dry by adding 250 ml. toluene and then stripping the solvent at reduced pressure. Add 4.4 grams of a solution of 6% cobalt naphthenate in dry xylene to 1250 ml. dry toluene and then add the resulting solution slowly to the melt at 75-80° C. with stirring. Add 131 grams of tolylene 2,4-diisocyanate over a ten minute period and stir another ten minutes. There should be a 2 to 5° temperature rise at this stage. Next, slowly add dropwise about 10 to 20 drops (0.4 to 0.8 gram) of water. Continue stirring at 80-95° C. for 15 minutes and then reduce the stirring speed. When the viscosity reaches about 200,000 cps. at about 85° C. (90 to 120 minutes), slowly add 1250 ml. of dry toluene (90 to 120 minutes) without lowering the temperature below 80° C. or markedly reducing the viscosity. After the toluene addition has been completed and the viscosity reaches about 300,000 cps. (about 15 minutes), equip the flask with a reflux condenser and then slowly add 104 grams of propylene oxide. After about ten minutes, remove the excess propylene oxide by distilling at reduced pressure. When the viscosity reaches 500,000 cps. (usually 5 to 15 minutes) terminate the reaction by stirring in 100 grams of absolute ethanol. Stir in 5 liters of hot water and stop the heating. Transfer the reaction mixture to a 20 liter flask, add 7.5 liters of water and distill off the toluene at reduced pressure. There is obtained a clear, amber solution of about 25% solids having a viscosity of about 10,000 to 25,000 cps. at 25° C.

An equimolar amount of polyethylene ether glycol having a molecular weight of about 4,000 or polypropylene ether glycol having a molecular weight of about 600 can be substituted for the PEG 6000.

PREPARATION II

Follow the procedure of Preparation I exactly except eliminate the propylene oxide step. A 25% aqueous solution of the polymer has a viscosity of about 8,000 cps.

PREPARATION III

The procedure of Preparation I is followed exactly except that the reaction is terminated with 100 g. of n-butanol instead of ethanol. The viscosity at 25° C. of a 25% aqueous solution of a polymer produced according to this procedure is substantially the same as the polymer produced according to Preparation I.

PREPARATION IV

The procedure of Preparation I is followed exactly except that 120 g. of tolylene 2,4-diisocyanate and 3.3 g. of the 6% cobalt naphthenate solution is employed. The viscosity at 25° C. of a 25% aqueous solution of a polymer produced according to this procedure is about 10,000 cps.

PREPARATION V

The procedure of Preparation I is followed except that polyethylene ether glycol having an average molecular weight of 4,000 (Carbowax 4000) and 200 g. of tolylene 2,4-diisocyanate is employed.

PREPARATION VI

The procedure of Preparation I is followed except that isopropanol is substituted for the ethanol. The polymer produced according to this procedure is substantially identical to that obtained according to the procedure of Preparation I. Similarly, absolute methanol can be substituted for the ethanol to obtain a substantially identical product.

PREPARATION VII

The procedure of Preparation I is followed exactly except that 187 g. of diphenylmethane 4,4'-diisocyanate is substituted for the tolylene 3,4-diisocyanate.

Example I

Prepare a 25% aqueous solution of the polymer produced according to Preparation I. Adjust the pH to 8.2 with 1 N sodium hydroxide. Under a blanket of nitrogen and with stirring, add sufficient 10% formalin to give 1.25% formaldehyde, calculated on the polymer solids. Heat the mixture to 70° C. for 30 minutes and then destroy any unreacted formaldehyde by adding sufficient 10% aqueous ammonia to bring the pH to about 8.5 to 9.0. Stir for another 20 minutes. This polymer produces a water-soluble film which is virtually tack-free at 75% relative humidity at 25° C., whereas the starting polymer is tacky at this humidity and is lower-melting.

Similar results are obtained employing starting polymers having about the same viscosity and prepared in the manner described in Preparation I employing a polyethylene ether glycol having a molecular weight of about 4,000 or polypropylene ether glycol having a molecular weight of about 600.

Example II

Follow the procedure of Example I exactly except start the reaction at 60° C. and then allow the mixture to cool at room temperature and add no ammonia to the resulting product. As in Example I, the resulting product produces stronger films which are less sensitive to atmospheric moisture than the starting polyurethanes.

Example III

Follow the procedure of Example I except adjust the pH of the starting polymer solution to 8.5 with 1 N sodium hydroxide and add 3% of 10% aqueous formaldehyde, calculated on the starting polymer solids. Heat the mixture for ½ hour at 70° C. After standing for one week at room temperature, the pH of the solution can, if desired, be adjusted with ammonia to pH 9. Polymers produced by this procedure have excellent strength when cast as films and are excellent sizes for polyethylene glycol terephthalic acid ester yarns, both monofilament and spun. Tackiness is absent in normal weave room conditions.

Example IV

Follow the procedure of Example II exactly, but substitute 2.25% formaldehyde for the 1.25% formaldehyde.

Example V

Follow the procedure of Example IV, but omit all heating and age at room temperature for several days.

Example VI

Adjust the pH of a 25% aqueous polyurethane solution having a viscosity of about 10,000 c.p.s. at 25° C., prepared according to the procedure of Preparation IV, to 4.0 with $H_3PO_4$. Add 0.03%, calculated on the polymer solids, of formaldehyde as a 1% aqueous solution. Maintain the mixture for 10–20 days at about 28° C. in the substantial absence of oxygen. The resulting mixture has a viscosity of about 130,000 to 180,000 at 28° C. as a 25% aqueous solution.

The properties of polymers (0.0075" film, 1.0" wide) produced by the above procedures are illustrated in the table below.

| Polymer | Yield Point (lbs.) | Breaking Strength (lbs.) |
|---|---|---|
| Preparation IV | 5.9 | 7.7 |
| Example I | 6.5 | 8.0 |
| Example III | 6.7 | 11.2 |
| Example VI | 9.1 | 12.3 |

Example VII

Follow the procedure of Example VI, but age for two days at 50° C. rather than 10–20 days at 28° C.

Example VIII

Follow the procedure of Example I, but substitute an equimolar amount of acetaldehyde for the formaldehyde.

Example IX

Follow the procedure of Example VI, but employ 7% benzaldehyde instead of formaldehyde, calculated on the polymer solids. The resulting mixture will contain sufficient excess benzaldehyde to produce a water-insoluble polymer, if heated for any appreciable time. The product should therefore not be heated to any significant extent prior to or during use.

Example X

Follow the procedure of Example IX, but employ 1% benzaldehyde, calculated on the polymer solids. The resulting mixture can be heated, e.g., at 50° C. until the desired viscosity is reached in the reaction product.

If only 0.1% benzaldehyde is employed, the reaction can be conducted at 70° C.

Example XI

Follow the procedure of Example VI, but substitute an equal molar amount of 30% aqueous glyoxal for the formaldehyde. The reaction rate is somewhat slower than with formaldehyde.

Similarly, follow the procedure of Example III, adjusting the pH to 7.2 and substitute 3% of 30% aqueous glyoxal for the formaldehyde. The pH of the mixture will drop to about 5.5. The resulting mixture is stable without gelling for at least several days.

Example XII

To a 25% aqueous solution of a polyurethane prepared according to the procedure of Preparation I, add 10%, by weight of polymer solids, of a dialdehyde starch prepared by oxidizing starch with $HIO_4$ ("Sumstar-S," Miles Chemical Co.). Cure at room temperature for one or more days. Upon prolonged aging, care should be taken, e.g., by the exclusion of oxygen or oxidizing agents and/or by the addition of alkaline buffering agents, to prevent the pH of the resulting mixture from drifting to the acid side. If an acid water-soluble product is desired, the amount of starch to be added should be substantially reduced.

Example XIII

Follow the procedure of Example I, but employ as starting polymer one produced according to the procedure of Preparation II. Films of the resulting polymer have strengths and freedom from tackiness at high relative humidity superior to that of the starting polymer.

Similarly, follow any of the procedures of Examples II to XII but employ, as starting polymer, one produced by the procedure of Preparation II. In every instance, the resulting polymer performs superior as a textile size to the starting polymer.

That which is claimed is:

1. A water-soluble aldehyde modified polyurethane produced by the reaction of an aldehyde and a water-soluble polyurethane reaction product in a dilute aqueous solution at a pH between about 3 and 10 and a temperature between about 0° and 100° C.; said polyurethane reaction product having a polymeric constituent reactive toward carbonyl groups and being the reaction product of a substantially anhydrous polyalkylene ether glycol and at least 0.5 molar equivalent of an organic diisocyanate at a temperature below about 110° C., said aldehyde modified polyurethane being characterized by higher film strength at high relative humidities than the unmodified polyurethane.

2. A polyurethane of claim 1 wherein the polyalkylene ether groups are polyethylene ether groups each having a molecular weight from about 750 to about 20,000.

3. A polyurethane of claim 2 further characterized by having a viscosity, as a 25% aqueous solution at 25° C., of between 2,000 and 1,000,000 cps.

4. A polymer of claim 3 wherein the aldehyde is formaldehyde.

5. A water-soluble aldehyde modified polyurethane of claim 1 wherein the polyurethane reaction product is a water-soluble polyalkylene ether glycol polyurethane having polymeric units consisting essentially of those of the formula

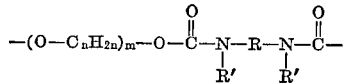

wherein $n$ is an integer from 2 to 8, inclusive, $m$ is an integer from about 15 to about 450, R is a divalent carbocyclic aryl radical, and R' is selected from the group consisting of hydrogen and

—CH(R″)—CH(R″)—OH wherein R″ is selected from the group consisting of hydrogen and lower-alkyl.

6. A polymer of claim 5 wherein the aldehyde is formaldehyde.

7. A polymer of claim 6 wherein R is a phenylene radical, $n$ is 2, and $m$ is from about 45 to about 225.

8. A polymer of claim 7 wherein R is 2,4-tolylene, $m$ is from about 100 to about 160 and R' is hydrogen.

9. A polymer of claim 7 wherein R' is —CH(CH₃)—CH₂OH.

10. A polymer of claim 9 wherein R is 2,4-tolylene and $m$ is from about 100 to about 160.

11. A process for improving the film strength of water-soluble polyurethane reaction products of substantially anhydrous polyalkylene ether glycols and organic diisocyanates having polymeric substituents reactive toward carbonyl groups, said reaction products being formed at a temperature below about 110° C., which comprises reacting said water-soluble polyurethane containing at least 0.5 molar equivalent of said diisocyanate with an aldehyde in a dilute aqueous solution at a pH between about 3 and 10 and a temperature between about 0° and 100° C. for a reaction time less than that required to produce a water-insoluble reaction product under the selected reaction conditions.

12. The process of claim 11 wherein the aldehyde is monofunctional.

13. The process of claim 12 wherein the aldehyde is formaldehyde.

14. A process of claim 11 wherein the starting polymer has polymeric units consisting essentially of those of the formula

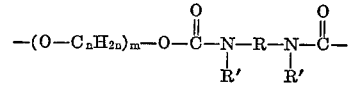

wherein $n$ is an integer from 2 to 8, inclusive, $m$ is an integer from about 15 to about 450, R is a divalent carbocyclic aryl radical, and R' is selected from the group consisting of hydrogen and

—CH(R″)—CH(R″)—OH wherein R″ is selected from the group consisting of hydrogen and lower-alkyl.

15. The process of claim 14 wherein the reaction temperature is between about room temperature and about 85° C. and less than 0.1% of formaldehyde, calculated on the starting polymer solids, is employed.

16. The process of claim 15 wherein R is a phenylene radical, $n$ is 2 and $m$ is from about 45 to about 225.

17. The process which comprises reacting a water-soluble polyurethane having polymeric units consisting essentially of those of the formula

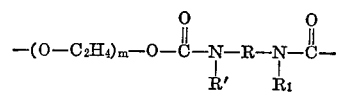

wherein $m$ is an integer from about 45 to about 225, R is a divalent carbocyclic aryl radical and R' is selected from the group consisting of hydrogen and

—CH(R″)—CH(R″)—OH wherein R″ is selected from the group consisting of hydrogen and lower-alkyl, with less than 5%, calculated on polymer solids, of formaldehyde in a dilute aqueous solution at a pH of between about 3 and 10 and a temperature from about room temperature to about 85° C. for a reaction time less than that required to produce a water-insoluble reaction product under the selected reaction conditions.

18. The process of claim 17 wherein the starting polymer is employed as an aqueous solution, R is 2,4-tolylene, R' is $CH(CH_3)CH_2OH$, $m$ is from about 100 to about 160, and the pH is between about 7 and about 10.

19. The process of claim 17 wherein the starting polymer is employed as an aqueous solution, R is 2,4-tolylene, R' is $CH(CH_3)CH_2H$, $m$ is from about 100 to about 160, the pH is between about 3 and about 7 and less than 0.05%, calculated on the polymer solids, of formaldehyde is employed.

20. A process for the production of a water-soluble polyurethane which comprises the steps of reacting a substantially anhydrous polyethylene ether glycol having a molecular weight of from about 2,000 to 10,000 with between about 1.0 and 1.5 molar equivalents of an aryl diisocyanate, under substantially anhydrous conditions and in the presence of a polymerization catalyst therefor, at a temperature of from about 70° C. to 110° C. for a time sufficient to produce a reaction product which, when chain terminated with ethanol and made up into a 25% aqueous solution has a viscosity of at least 8,000 cps. at 25° C., and then adding a chain terminating agent to stop the reaction and produce a water-soluble polymer and reacting the resulting polymer with an aldehyde in a dilute aqueous solution at a pH of between about 3 and about 10 at a temperature between about room temperature and about 85° C., for a reaction time less than that required to produce a water-soluble reaction product having a viscosity of 1,000,000 cps. as a 25% aqueous solution at 25° C.

21. A process according to claim 20 wherein the aldehyde is formaldehyde.

22. A process for the production of a water-soluble polyurethane which comprises the steps of reacting a substantially anhydrous polyethylene ether glycol having an average molecular weight of about 6,000 with between about 1.05 and 1.2 molar equivalents of tolylene 2,4-diisocyanate under substantially anhydrous conditions and in the presence of a polymerization catalyst therefor, at a temperature between about 70° C. and 95° C., while conducting at least the terminal portion of the reaction in the presence of at least two molar equivalents, calculated on the tolylene 2,4-diisocyanate of propylene oxide, for a time sufficient to produce a reaction product which when chain terminated with ethanol and made up into a 25% aqueous solution has a viscosity of between about 8,000 and 30,000 cps. at 25° C., and then adding a lower alkanol having less than 4 carbon atoms to the reaction mixture to stop the reaction and produce a water-soluble polyurethane, and reacting an aqueous solution of the thus produced polyurethane with less than 5%, calculated on the polymer solids, of formaldehyde in a dilute aqueous solution at a pH of between about 3 and 10 at a temperature between about room temperature and about 85° C. to produce a water solution of the thus produced polymer.

23. A process according to claim 22 wherein less than about 0.05% formaldehyde is employed and the initial pH is between about 3 and 7.

24. A process according to claim 22 wherein between about 1% and 4% formaldehyde is employed and the initial pH is between about 7 and 9.

25. A process according to claim 23 wherein the first reaction is conducted in toluene and continued until the reaction mixture has a viscosity between about 300,000 and 800,000 cps. as a 65% solution in toluene at 85° C.

References Cited

UNITED STATES PATENTS

| | | | |
|---|---|---|---|
| 3,021,307 | 2/1962 | Csendes | 260—72 |
| 3,043,801 | 7/1962 | Wagner et al. | 260—47 |
| 3,087,912 | 4/1963 | Wagner et al. | 260—67 |
| 3,189,578 | 6/1965 | Kummerer | 260—77.5 |

WILLIAM H. SHORT, *Primary Examiner.*

H. SCHAIN, *Assistant Examiner.*

U.S. Cl. X.R.

8—115.5, 115.7, 116.3, 128, 129; 117—138.8, 161, 139.5; 260—72, 77.5, 17.3

UNITED STATES PATENT OFFICE
CERTIFICATE OF CORRECTION

Patent No. 3,427,272                                              February 11, 1969

Edgar Dare Bolinger et al.

It is certified that error appears in the above identified patent and that said Letters Patent are hereby corrected as shown below:

Column 15, line 2, cancel "160"; line 5, the formula should appear as shown below:

$$CH(CH_3)CH_2OH$$

same column 15, line 26, "water-soluble" should read -- water-insoluble --.

Signed and sealed this 31st day of March 1970.

(SEAL)
Attest:

Edward M. Fletcher, Jr.                              WILLIAM E. SCHUYLER, JR.
Attesting Officer                                               Commissioner of Patents